United States Patent [19]

Beaupere et al.

[11] Patent Number: 4,677,638
[45] Date of Patent: Jun. 30, 1987

[54] GAS LASER GENERATOR

[75] Inventors: Didier Beaupere, Paris; Guy Helias, Cerisiers, both of France

[73] Assignee: Compagnie Industrielle des Lasers Cilas Alcatel, Marcoussis, France

[21] Appl. No.: 734,351

[22] Filed: May 14, 1985

[30] Foreign Application Priority Data

May 14, 1984 [FR] France ................................ 84 07416

[51] Int. Cl.4 ............................................ H01S 3/097
[52] U.S. Cl. ........................................ 372/87; 372/86; 372/83; 372/55
[58] Field of Search ........................ 372/86, 55, 87, 83

[56] References Cited

U.S. PATENT DOCUMENTS 3,740,662 6/1973 Faray et al. ............................ 372/87
4,542,529 9/1985 Pace et al. ............................. 372/86

OTHER PUBLICATIONS

Applied Physics Letters, vol. 31, No. 3, Aug. 1, 1977, American Institute of Physics, New York (US).
Review of Scientific Instruments, vol. 54, No. 6, Jun. 1983, pp. 719-721, New York, US.

Primary Examiner—Leon Scott, Jr.
Attorney, Agent, or Firm—Sughrue, Mion, Zinn, Macpeak, and Seas

[57] ABSTRACT

The generator is excited by an electric discharge through the gas between two electrodes (6, 7), at least one of which (6) is made of silicon carbide.

9 Claims, 2 Drawing Figures

GAS LASER GENERATOR

The present invention relates to a gas laser generator of the type comprising means for forming a resonant optical cavity on an axis, and active gas disposed in the cavity, two electrodes disposed opposite each other and in contact with the active gas, at least one of said electrodes being constituted by a conductive material of high resistivity, and an electrical supply circuit having two outputs respectively connectable to said two electrodes to create an electrical discharge therebetween in the active gas suitable for forming laser radiation oscillating in the cavity, said cavity further including means for allowing a portion of the oscillating radiant energy to escape to form a laser beam.

A gas laser generator of this type is known and described in the American article "A transversely excited multiatmosphere $CO_2$ waveguide laser" (A. F. Gibson et al) which appeared in "Applied Physics Letters", vol 31, No. 3, Aug. 1st, 1977, pages 176 to 178. This waveguide type of carbon dioxide laser generator includes a silicon cathode. Since the gas is at atmospheric pressure, an energy density of 5 Joules per liter of useful active gas was measured.

The object of the present invention is to improve the performance of known gas laser generators. The invention provides a gas laser generator of the above-mentioned type, characterized in that the said high resistivity conductive material is silicon carbide.

Figure 1:
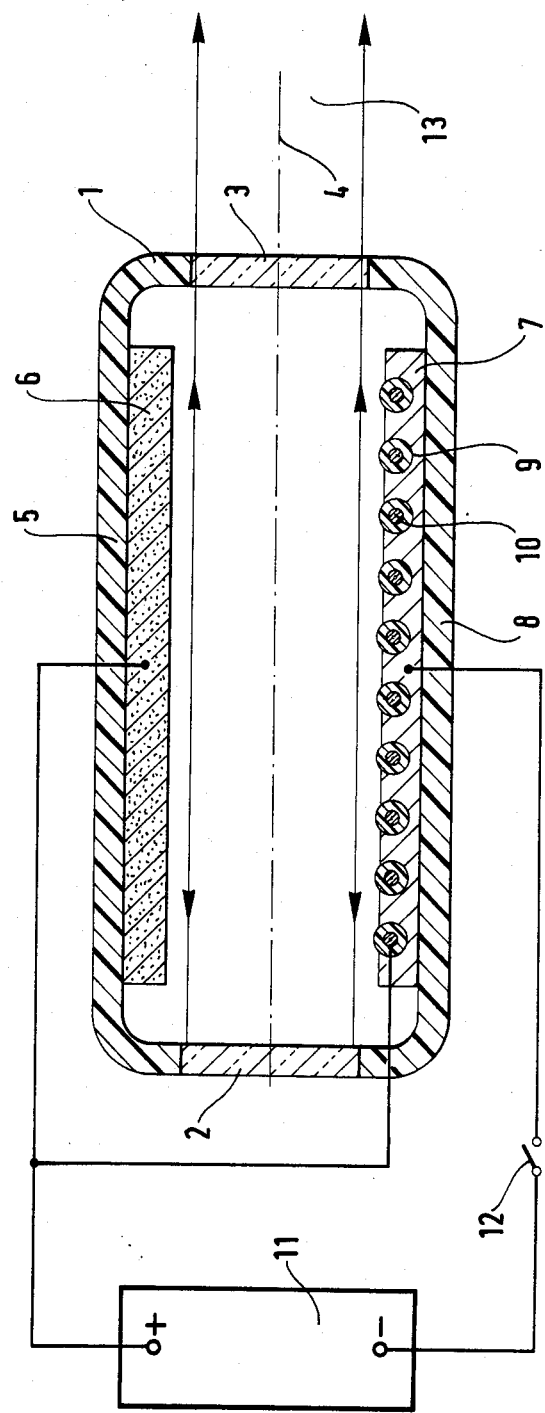
Figure 2:
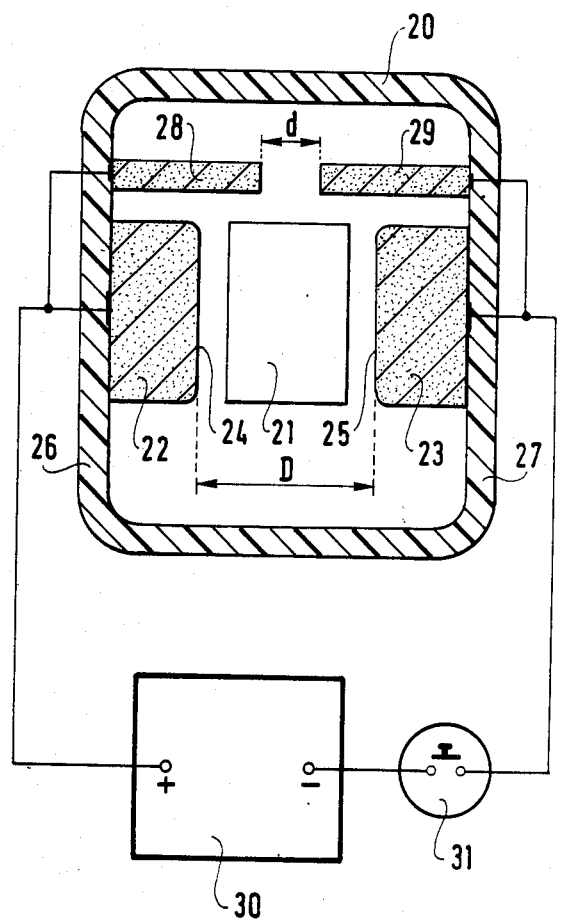

Particular embodiments of the present invention are described below by way of example with reference to the accompanying figures in which FIG. 1 is a diagrammatic longitudinal section through one embodiment of a laser generator in accordance with the invention, and FIG. 2 is a diagrammatic cross-section through another embodiment of a laser generator in accordance with the invention.

FIG. 1 shows an insulating rectangular chamber 1 containing an active laser gas such as a mixture of carbon dioxide, helium and nitrogen. The walls of two opposite faces of the enclosure 1 include respective mirrors 2 and 3 which form a resonant optical cavity in the chamber 1 along a longitudinal axis 4 of said chamber. The mirror 2 is totally reflecting for radiation at a wavelength of about 10.6 microns, and the mirror 3 is particularly transparent to such radiation.

The inside wall of another face 5 of the chamber 1 has a longitudinal rectangular shaped electrode 6 disposed thereon. Another rectangular electrode 7 made of aluminum is disposed on the inside wall of the face 8 opposite to the face 5. The electrodes 6 and 7 are thus parallel to each other and to the axis 4. According to a feature of the invention, the electrode 6 is made of silicon carbide. The electrode 6 may be a ceramic formed by sintering a silicon carbide powder. The face of the electrode 7 which is in contact with the active gas has parallel grooves 9 therein with insulated conductors 10 housed in said grooves. The electrodes 6 and 7 are respectively connected via electrical connections passing through the chamber wall, to the positive and negative poles of a high tension electricity supply source 11, via a switch 12. The electrical connection between the electrode 6 and the connecting wire which leads to the source 11 may be provided by depositing a thin layer of gold or silver on said electrode, e.g. by means of a paint brush, with the end of the connection wire being fixed to said layer by gold brazing. The conductors 10 are connected to the positive pole of the source 11.

The above-described laser generator operates as follows. By operating the switch 12, a high tension pulse is formed which polarizes the electrodes 6 and 7, with the cathode 7 being taken to a negative potential relative to the anode 6. The potential difference is selected to be great enough to cause an electric discharge to take place transversely through the active gas, with the presence of the conductors 10 serving to make said discharge more uniform. The electric discharge creates laser radiation in the active gas at a wavelength of 10.6 microns and oscillating inside the cavity, with a portion of said radiation leaving the cavity via the mirror 3 to constitute a laser beam 13.

It has been observed that the performance gas lasers of the type illustrated in FIG. 1 is considerably increased relative to the performance of lasers fitted with two conventional conductive electrodes (e.g. made of aluminum), and also relative to the performance of lasers including a silicon electrode as is known in the prior art. In particular, the power per unit volume of pulse gas lasers of the type illustrated in FIG. 1 is increased.

By way of example, in a gas laser having an active volume of 3.6 $cm^3$, fitted with a silicon carbide electrode and an aluminum electrode, said laser being filled with a mixture of carbon dioxide gas and of nitrogen at atmospheric pressure, and said gas being subjected to a transverse electric discharge having a duration of 100 ns and an energy density of 1.3 KJ per liter, the measured laser power per unit volume was 370 MW per liter and the measured laser energy per unit volume was 24 Joules per liter. When the same laser was filled with a mixture of carbon dioxide gas, nitrogen and helium, the measured laser energy per unit volume was 30 Joules per liter.

FIG. 2 shows a rectangular insulating chamber 20 containing a laser active gas such as a mixture of carbon dioxide gas, helium and nitrogen. The walls of two opposite faces of the chamber 20 include a mirror 21 and another mirror which is not visible in the figure, respectively. These mirrors form a resonant optical cavity in the chamber 20 along an axis which projects up from the plane of the figure.

The inside walls of two other opposite faces 26 and 27 of the chamber 20 have two respective rectangular main electrodes 22 and 23 thereon in contact with the active gas. These electrodes have two respective plane surfaces 24 and 25 which are parallel to each other and which face each other. The electrodes 22 and 23 are constituted by silicon carbide: they may be provided in the form of ceramic blocks obtained by sintering silicon carbide powder.

Preferably, two auxiliary electrodes 28 and 29 are disposed opposite each other in contact with the active gas and to one side of the two main electrodes. The auxiliary electrodes are of smaller cross-section than the main electrodes and they are constituted of a silicon carbide of higher resistivity than the silicon carbide of the main electrodes. The distance d between the auxiliary electrodes is less than the distance D between the main electrodes. The electrodes 28 and 23 are connected to the positive pole of a high tension generator 30 via electrical connections passing through the face 26 of the chamber 20. The electrodes 23 and 29 are connected to the negative pole of the generator 30 via a switch 31 and via electrical connections passing through the face 27 of the chamber 20.

The electrical connection between each of the electrodes and the connection wire may be performed by painting a thin layer of gold or silver on the electrode with the end of the connection wire being fixed to said layer by gold brazing.

The laser generator shown in FIG. 2 operates as follows. By closing the switch 31, the electrodes 22 and 28 are raised to a high positive potential relative to the electrodes 23 and 29 respectively. An electric discharge is initially set up between the auxiliary electrodes 28 and 29. This discharge ionizes the space between the main electrodes, thereby causing the main electric discharge to be triggered between the electrodes 22 and 23. The main discharge creates radiation in the active gas at a wavelength of 10.6 microns and oscillating in the cavity. One of the cavity mirrors is partially transparent to allow a portion of said oscillating radiation to leave and thus form a laser beam.

The advantage of pre-ionizing the active laser gas is that it facilitates the main discharge. Naturally the pre-ionization, which in example described takes place by means of two silicon carbide auxiliary electrodes, could be provided by other known means, e.g. using arc slopes or a generator of ultraviolet radiation.

It is observed that the main electric discharge of lasers of the type shown in FIG. 2 is particularly dense and uniform. In particular it is not necessary to make grooves in one of the electrodes in order to locate insulated conductors therein connected to the other electrode in order to increase the uniformity of the discharge in the manner recommended for the laser generator shown in FIG. 1. The generator shown in FIG. 2 is thus more simple and easier to implement than the laser generator shown in FIG. 1, for given performance.

In addition, lasers of the type shown in FIG. 2 are considerably more reliable; the two silicon carbide electrodes are highly resistant to cratering due to the electric discharge.

By way of example, the resistivity of the silicon carbide constituting the main electrodes may be several tens of ohm-centimeters during discharging, while the silicon carbide constituting the auxiliary electrodes may have a resistivity of several thousand ohm-centimeters.

We claim:

1. In a gas laser generator comprising:
   means for forming a resonant optical cavity along an axis;
   a laser active gas disposed in the cavity;
   two main electrodes disposed facing each other and in contact with the active gas, at least one of said main electrodes being constituted by a conductive material of high resistivity; and
   an electrical supply circuit connected to said two main electrodes respectively in order to create an electric discharge of high current therebetween in the active gas for forming laser radiation oscillating in the cavity, said cavity including means for allowing a portion of oscillating radiation energy to escape in order to form a laser beam,
   the improvement wherein said high resistivity conductive material of said at least one main electrode is silicon carbide having a resistivity which decreases as current increases such that under electric discharge between said two main electrodes said at least one main electrode of silicon carbide provides low impedance to the flow of said high current.

2. A laser generator according to claim 1, wherein said supply circuit (11,12) comprises a pulse generator.

3. A laser generator according to claim 1, wherein the laser active gas is a mixture of carbon dioxide gas, helium and nitrogen at atmospheric pressure, and said main electrodes (6, 7) are disposed relative to the axis (4) of the cavity in such a manner that the electrical discharge is transversal to said axis.

4. A laser generator according to claim 1, wherein said at least one silicon carbide main electrode is the anode (6).

5. A laser generator according to claim 4, wherein the cathode (7) is an electrode of low resistivity and includes grooves (9) in which insulated conductors (10) are housed, said conductors being electrically connected to the anode (6).

6. A laser generator according to claim 1, characterized in that both main electrodes (22, 23) are made of silicon carbide.

7. A laser generator according to claim 6, wherein said two main electrodes (22,23) include two respective plane parallel surfaces (24, 25) which are opposite each other.

8. A laser generator according to claim 6, further including means for pre-ionizing the laser active gas (28, 29), said pre-ionization means are auxiliary electrodes (28, 29) made of silicon carbide, said auxiliary electrodes being disposed opposite each other and in contact with the active gas in the vicinity of the main electrodes (22, 23), the distance (d) between the auxiliary electrodes being less than the distance (D) between the main electrodes (22, 23) and wherein the improvement further comprises the silicon carbide constituting the auxiliary electrodes being of higher resistivity than the silicon carbide constituting the main electrodes, the two auxiliary electrodes (28, 29) being electrically connected to respective ones of the two main electrodes (22, 23).

9. A laser generator according to claim 8, characterized in that the two electrodes (22, 23) are main electrodes, the said pre-ionization means are auxiliary electrodes (28, 29) made of silicon carbide, said auxiliary electrodes being disposed opposite each other and in contact with the active gas in the vicinity of the main electrodes (22, 23), the distance (d) between the auxiliary electrodes being less than the distance (D) between the main electrodes (22, 23), the silicon carbide constituting the auxiliary electrodes being of higher resistivity than the silicon carbide constituting the main electrodes, the two auxiliary electrodes (28, 29) being electrically connected to respective ones of the two main electrodes (22, 23).

* * * * *